Dec. 8, 1970     K. G. JUNKERT ET AL     3,546,470
APPARATUS FOR ELECTRICALLY SCANNING INSTRUMENT DIALS
Filed Oct. 10, 1968     3 Sheets-Sheet 1
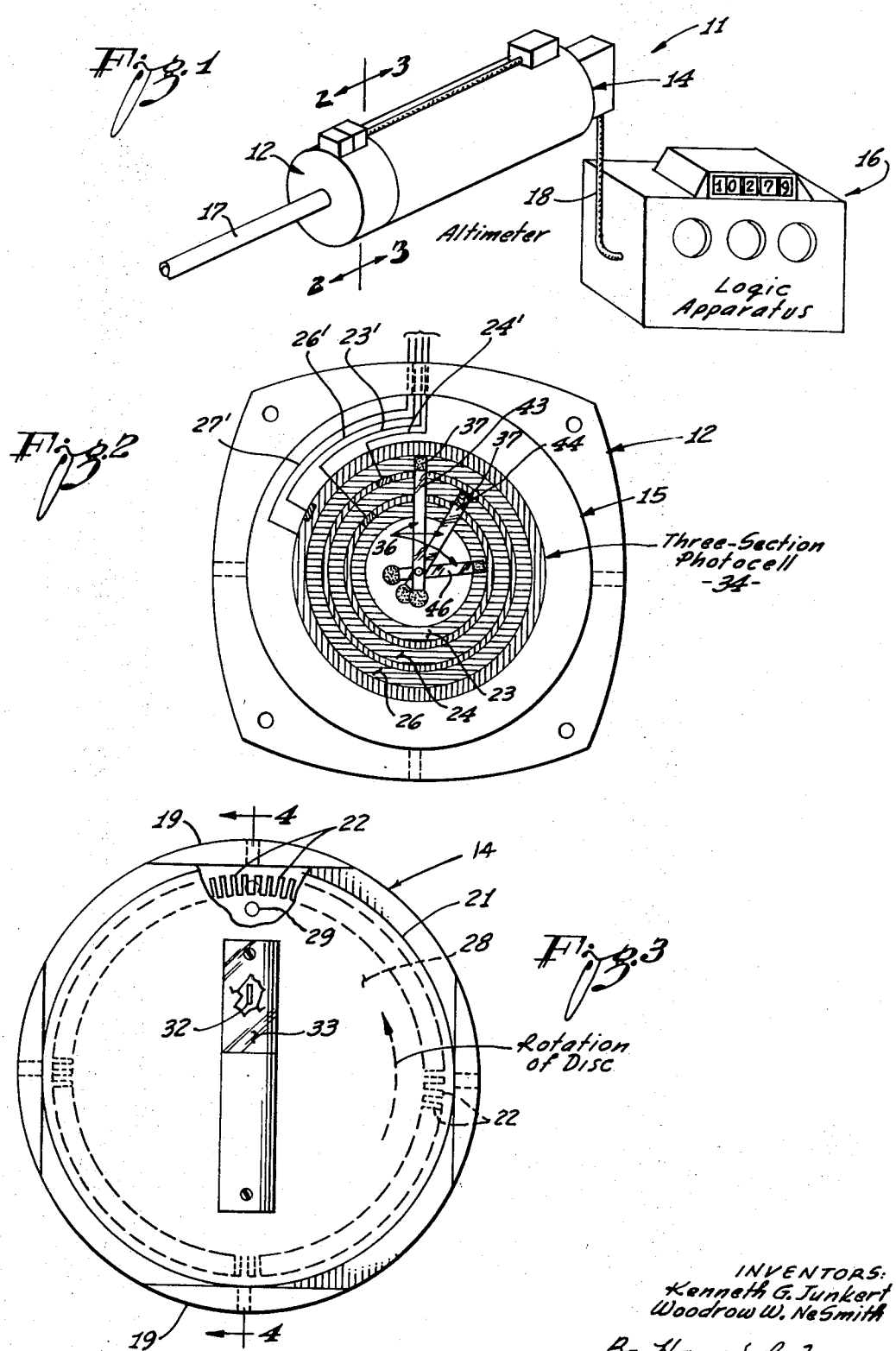
INVENTORS:
Kenneth G. Junkert
Woodrow W. NeSmith
By Harold L. Fox
AGENT Dec. 8, 1970   K. G. JUNKERT ET AL   3,546,470
APPARATUS FOR ELECTRICALLY SCANNING INSTRUMENT DIALS
Filed Oct. 10, 1968   3 Sheets-Sheet 3
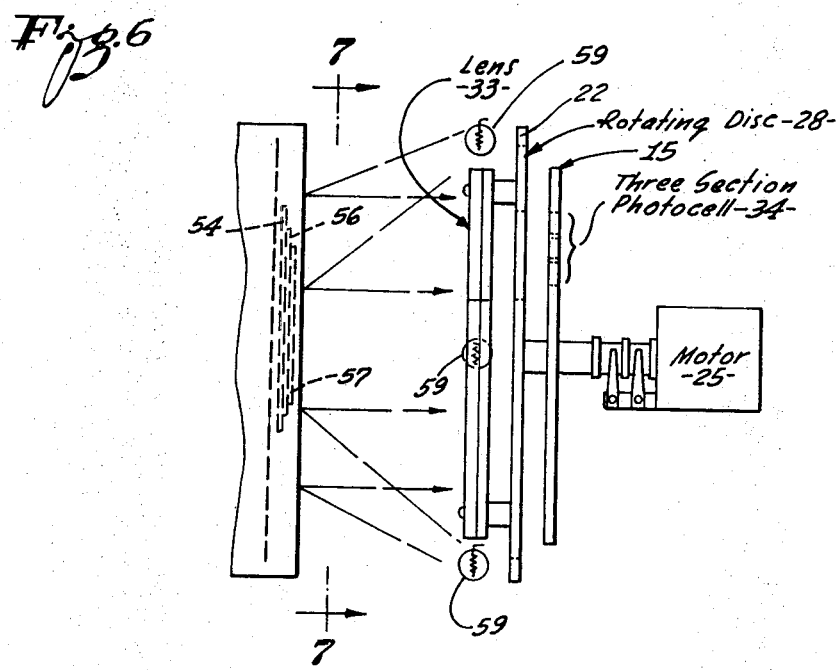
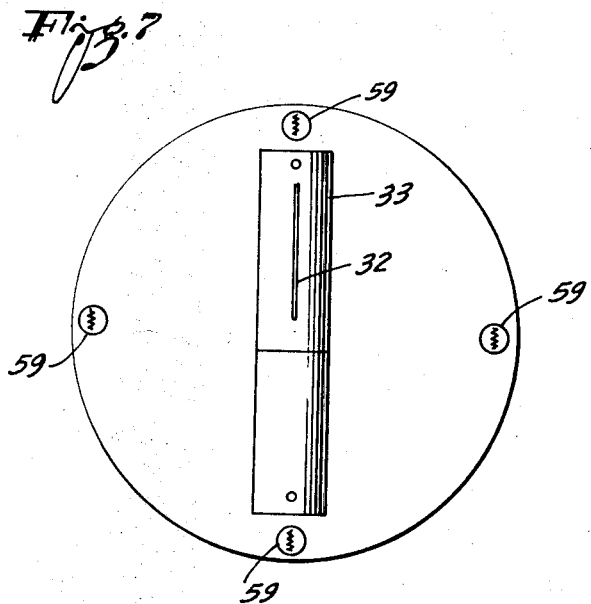
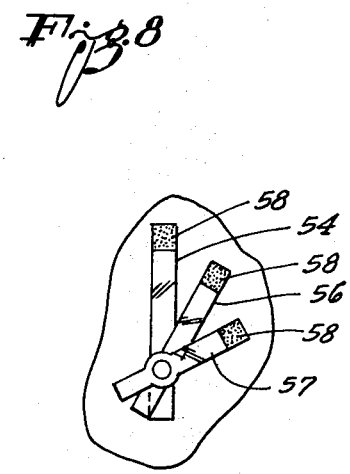
INVENTORS:
Kenneth G. Junkert
Woodrow W. NeSmith
By Harold L. Fox
AGENT United States Patent Office 3,546,470
Patented Dec. 8, 1970

3,546,470
APPARATUS FOR ELECTRICALLY SCANNING INSTRUMENT DIALS
Kenneth G. Junkert, El Segundo, and Woodrow W. Ne Smith, Claremont, Calif., assignors to Northrop Corporation, Beverly Hills, Calif., a corporation of California
Filed Oct. 10, 1968, Ser. No. 766,461
Int. Cl. G06k 11/00
U.S. Cl. 250—219   9 Claims

ABSTRACT OF THE DISCLOSURE

An instrument of the dial type, including one or more indicating members, mounted for rotation with respect to the dial of the instrument, and including apparatus associated and cooperating therewith adapted to provide a plurality of electric pulses enabling the respective positions of the indicating members to be determined with respect to a predetermined position on the dial of the instrument. In turn, the aforementioned electric pulses may be transmitted to conventional logic apparatus where they are presented in digital form.

---

The present invention relates generally to indicating instruments and more particularly to instruments of the dial type, including one or more indicaing members rotating with respect to the dial of the instrument, and including apparatus associated and cooperating therewith adapted to scan the dial of the instrument to provide a plurality of electric pulses enabling the respective positions of the indicating members to be determined with respect to the dial.

To the best of applicants' knowledge, instruments of the above type, mounted in aircraft and functioning to determine altitudes, air speeds etc., of an aircraft are normally visually observed by the pilot or co-pilot of the aircraft in which the instruments are mounted. The above procedure is unsatisfactory in that human error is often encountered in the reading of these instruments and other objectionable features are also experienced which arew ell known to those skilled in the art.

In the present application, an altimeter is used for purposes of illustration. In reading an altimeter it is quite easy to effect an error of plus or minus one thousand feet (±1000′) in the reading thereof. Further if permanent records are to be retained using present methods, photographic means must be employed which involves objectional features also familiar to those skilled in the art.

It is an object of the present invention to disclose an instrument of the dial type, having one or more indicating members rotating relative to the face of the dial of the instrument, and function to provide electric pulses corresponding to the exact positions of the indicating members with respect to the face of the instrument.

Although the characteristic features of the present invention are particularly pointed out in the appended claims, the invention itself, also the manner in which it may be carried out, will be better understood by referring to the following description taken in connection with the accompanying drawings forming a part of this application and in which:

FIG. 1 is a perspective view of the apparatus as disclosed herein.

FIGS. 2 and 3 are views of the apparatus of FIG. 1 taken on the lines 2—2 and 3—3, respectively, of the latter figure.

Figure 4:
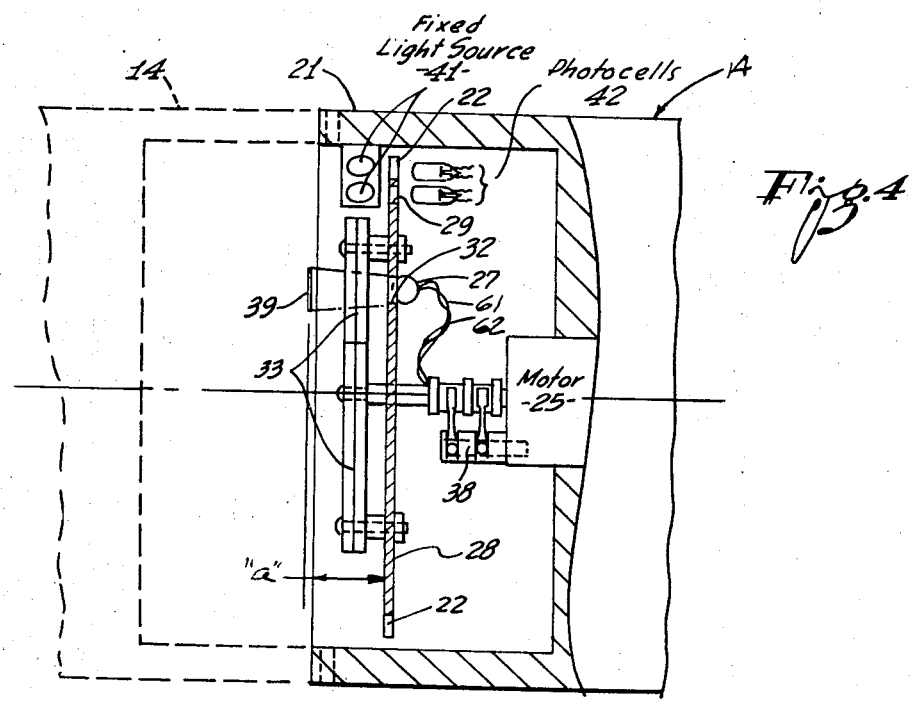
FIG. 4 is a view of FIG. 3 taken on the line 4—4 thereof.

FIG. 6 constitutes another embodiment of the apparatus similar to that shown in FIGS. 2–4.

FIG. 7 constitutes a view of FIG. 6 taken on line 7—7 of the latter figure.

FIG 8 constitutes a fragmentary view of the indicating members of FIG. 6.

Referring to the drawings, apparatus as disclosed herein—indicated in its entirety by the numeral 11—is shown in FIG. 1. For purposes of illustration the apparatus shown in FIG. 1 is discussed in connection with an altimeter 12. Accordingly it is assumed the apparatus 11 is mounted in an aircraft (not shown) and functions to record elevations of the aircraft.

Major components of the apparatus 11 include an altimeter 12—modified as disclosed herein—scanning and logic apparatus 14 and 16, respectively. In modifying the altimeter 12, as referred to above, care is exercised to be sure that the seals thereof are not broken, the bellows (not shown) communicates with ambient atmosphere through a conduit 17 in a conventional manner. Electric pulses—referred to further as the disclosure progresses—originating with the altimeter 12 and scanning apparatus 14 are transmitted to the logic apparatus 16 by means of a cable 18 where they are presented in digital form.

By referring further to the drawings and particularly FIG. 2, it will be seen that the original dial of the altimeter 12 has been replaced by a disc-like member 15 major portions of which constitute a photo-electric cell 34. In the present embodiment the photo-electric cell 34 include three individual photo-electric cells 23, 24 and 26 having a concentric relation with respect to each other. Each of the individual cells 23, 24 and 26 include an active area (horizontal lines—FIG. 2) separated and insulated by "ohmic" material (vertical lines—FIG. 2). Electric pulses, previously referred to, originating with the cells 23, 24 and 26 are transmitted to the logic apparatus 16 via connectors 23′, 24′, and 26′ via a cable 18.

The original indicating members or pointers of the altimeter 12 have been replaced by indicating members 36. In the present embodiment three individual indicating members 43, 44 and 46 are shown. These members (members 43, 44 and 46) function in a normal manner in so far as rotation thereof with respect to the dial (photo-cell 34) is concerned. By referring further to FIG. 2 it will be seen that the outer ends of the indicating members 36 are constructed of opaque material indicated by the numeral 37 while the remainder of the indicating members are constructed of transparent material. Thus it will be seen that portion of the member 43 sweeps the individual cell 26 as it rotates about its axis, likewise the opaque portion of member 44 sweeps the cell 24 and the opaque portion of the member 46 sweeps the cell 23. Why the members 36 are constructed in the above manner and have the relationships described with respect to the photo cell 34 will become apparent as the disclosure progresses.

The scanning apparatus 14 includes a hollow housing 21 of cylindrical configuration having an electric motor 25 mounted therein with the axis thereof coinciding with the axis of the housing as indicated by the line x—x in FIG. 4.

Mounted on and rotating with the shaft of the motor 25 is a disc member 28 which is slightly less in diameter than the inside diameter of the housing 21. The periphery of the member 28 is serrated to provide a plurality of rectangular tooth-like projections as indicated by the numeral 22 in FIGS. 3 and 4. In addition to the tooth-like projections 22 an inboard portion of the disc 28 has an aperture 29 provided therein, the aperture 29 is referred to as the reset aperture for reasons that will be apparent as the disclosure progresses. The disc 28 also has an aperture 32 of rectangular configuration provided therein at a location inboard of the serrations 22 and aperture 29 substantially as shown in FIGS. 3 and 4. Also mounted on the shaft of the motor 25, for rotation therewith and in front of the disc 28, is a lens member 33 the forward face of which has an arcuate configuration for a purpose to be explained presently.

Fixedly mounted on the aft side of the disc 28, adjacent the aperture 32, is a light source 27. Electrical energy for the light source 27 is supplied by means of connectors 61 and 62, electrical energy therefor being transferred through the brushes 38 as shown in FIG. 4. Light from the source 27 passes through the aperture 32 and is focused as a line of light 39 at a predetermined distance $a$ forward of the arcuate surface of the lens member 33 as shown in FIG. 4.

Mounted on the inside wall of the housing 21, at a location on opposite side of the member 28, is a pair of light sources and a pair of photo-electric cells 41 and 42, respectively. Specifically the light sources 41 are mounted so that light from the outer source are intermittently broken or chopped by the serrations 22 as the disc 28 rotates and light from the inboard light source 41 pass through the aperture 29 to contact one of the photo-cells 42.

In the assembled relation the altimeter and scanning apparatus 12 and 14, respectively, have a face-to-face relation, in other words the scanning apparatus 12, specifically the lens 33 faces and its arcuate face are adjacent the indicating members 36 of the altimeter 12. This relationship is effected and maintained in that the housing of the altimeter 12 is received and secured within the portions 19 of the housing 21.

Assembled as described above the lens 33 is located a predetermined distance from—in front of—the central indicating member 44. Thus it will be apparent that light emitted from the aperture 32 will not effect either of the individual cells 23, 24 or 26 except at such times as an opaque portion 37 thereof blocks the aforementioned light. Likewise it will be apparent that light will pass through the clear portions of the indicating members 43, 44 or 46 at such times as two of the members 36 are aligned, in other words the focused light 39 will not completely effect all the three individual cells 23, 24 and 26 except at such times as the three members 43, 44 and 46 are aligned in the latter case the light 39 will be completely blocked by the opaque portions of the members 43, 44 and 46.

It is assumed that the apparatus 11 is to record altitudes within plus or minus ($\pm$) ten feet. For purposes of illustration it is assumed the apparatus 11 is mounted in an airplane having a maximum climb or dive rate of 60,000 feet per minute or 1,000 feet per second. Accordingly the motor 25 must turn at an r.p.m. equal to or greater than .15 (C), where C is the climb or dive rate expected. In anticipation of rates of 60,000 feet per minute, the motor 25 has a constant speed of 9,000 r.p.m. (.15 x 60,000). Therefore lower climb or dive rates are scanned easily and the motor speed (or scanning rate) remains at 9,000 r.p.m., thus 150 revolutions of the disc 28 occur every second. In view of these facts 100 projections 22 are provided for each revolution of the disc 28 or 15,000 projections per second. This insures that small increments of change of indicating members 43, 44, or 46, even at high climb or dive rates of the aircraft, can be detected and resolved to plus or minus ($\pm$) 10 feet by the scanning and logic apparatus 14 and 16, respectively and subsequently recorded in a digital form by a recording medium.

Figure 5:
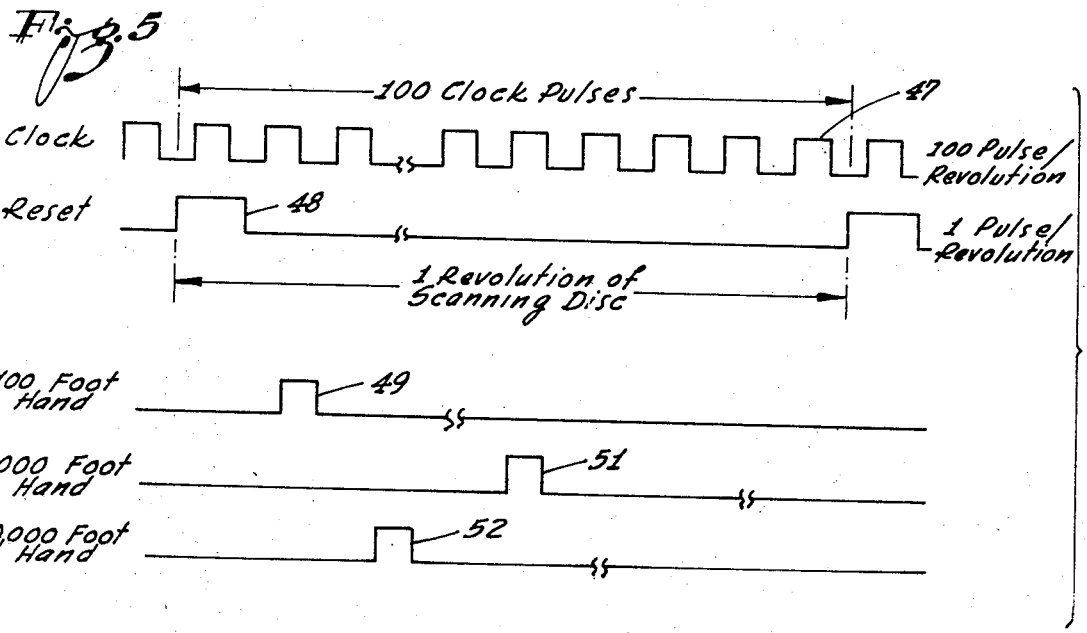
FIG. 5 is a graphic showing of the electric pulses generated by the apparatus of FIGS. 2, 3 and 4.

Referring to FIG. 5, the electric pulses generated by the altimeter 12 and scanning apparatus 14 are shown. The first line represents the electric pulses due to light from the outboard light source 41 contacting its respective photo-cell 42, in the present embodiment one hundred (100) pulses occur per revolution of the disc 28 and are referred to as clock pulses 47 as shown in the first line of FIG. 5. The second line represents the electric pulse as light from the inboard source 41 contacts its respective photo-cell 42. This pulse indicated by the numeral 48 occurs only once per revolution of the disc 28 and is referred to as a reset pulse.

The angular relation of the indicating members 43, 44 and 46, with respect to a predetermined line or location on the dial or photo-cell 34 of the altimeter 12, is determined by the scanning apparatus 14, electric pulses 49, 51 and 52, corresponding to these positions, are shown in lines 3, 4 and 5 of FIG. 5. For each revolution of the disc 28 three electric pulses are provided corresponding to the respective position of each of the members 43, 44 and 46. Light rays, originating with the source 27 and focused by the lens 33, as indicated by the line 39, contacts the photo-cell 34 (individual photo-cells 23, 24 or 26) to provide a continuous voltage. This continuous voltage is interrupted—once per revolution of the disc 28—at such times as the aforementioned light 39 falls on an opaque section 37 of the pointer members 43, 44 and 46. Thus a collapse of the electric pulses occur representing the exact positions of the members 43, 44 and 46 as represented by the numerals 49, 51 and 52 of lines 3, 4 and 5 of FIG. 5.

The information described above can be readily interpreted utilizing a conventional type of logic apparatus 16. All records of current pulses, representing the location of the members 43, 44 and 46 are wiped clear or reduced to zero each time the reset pulse 48 occurs. Accordingly a pulse 47, represents the current position of the members 43, 44 and 46 for each revolution of the disc 28. In this respect, previous information received regarding the position of the members 43, 44 and 46 is stored in a memory system for future reference.

The embodiment shown in FIGS. 6-8 is similar to the embodiment shown in FIGS. 2-4, however, the differences embodied in FIGS. 6-8 will be discussed briefly, like numerals being used to denote like components in FIGS. 6-8 and FIGS. 2-4.

The principle differences between the embodiment shown in FIGS. 6-8 and that shown in FIGS. 2-4 is in the construction of the indicator pointers identified by the numerals 54, 56 and 57. Portions 58 (outer ends) of the surfaces of the indicating members 54, 56 and 57 are silvered, accordingly, light from a plurality of light sources 59, positioned around the periphery of the disc 28, are reflected substantially as shown in FIG. 6. The silvered portions 58 of the members 54, 56 and 57 sweep or define areas of the photo-cell 34 corresponding to a respective photo-cell (23, 24 and 26). The remainder of the members 54, 56 and 57 are constructed of a clear material. At such time as the rectangular aperture 32 lines up with one of the portions 58 light therefrom is reflected through the slit and contacts its respective photo-cells 23, 24 or 26.

Accordingly it will be apparent that three electric pulses, as shown in lines 3-5 of FIG. 5, will be generated for each revolution of the disc 28. As previously explained in connection with FIGS. 2-4, these pulses are correlated with the pulses previously received in lines 1 and 2 of FIG. 5 and the positions of the indicating members 54, 56 and 57 determined.

Accordingly it will be seen that an altimeter and scanning device is provided that will indicate the position of the members (altitude) within an accuracy of plus or minus ten feet (10').

We claim:
1. In instruments of the dial type including a plurality of indicating members rotatably mounted thereon the combination with apparatus adapted to scan the face of the dial and providing a plurality of electric pulses which when correlated may be used to indicate the positions of the respective indicating members relative to a predetermined position on the dial of the instrument comprising:
(a) an instrument including a hollow housing of cylindrical configuration and a circular dial member fixedly mounted on said housing the axis of which is common with the axis of said housing;
(b) major portions of said dial member comprising primary photo-sensitive means;
(c) indicator means of the rotating type mounted on dial member, adjacent said photo-sensitive means, and being movable with respect to said dial in response to changes in atmospheric pressure;
(d) a disc member rotatably mounted in said housing adjacent said indicating members and having an opposed relation with respect to said photo sensitive means;
(e) the peripheral portion of said disc member having indexing means provided therein and having light emitting and reset apertures provided therein in spaced relation with respect to said indexing means and with respect to each other;
(f) a secondary light source and secondary photo-sensitive means fixedly mounted on opposite side of said disc member functioning to provide a plurality of electric pulses and a reset electric pulse, as intensity of light from said secondary light source is varied by said indexing means and reset aperture as said disc rotates;
(g) a primary light source fixedly secured to said disc member adjacent to said light emitting aperture;
(h) and means including a primary source adjacent said light emitting aperture whereby light passing therethrough is focused and normally contacts said primary photosensitive means and functions to provide a principle electric pulse at such time as focused light from said primary light source is interrupted by said indicating means which pulse is adapted to be correlated with said plurality of pulses and reset pulse to determine the exact position of said indicating means on said dial and consequently the elevation of said altimeter.

2. Apparatus as set forth in claim 1:
(a) in which said photo-sensitive means constitutes at least three active areas of circular configuration and of predetermined width constituting individual cells;
(b) and said individual cells having a concentric relation insulated from each other whereby individual electric pulses are provided by each individual cell in response to changes in intensity of light contacting said individual cells.

3. Apparatus as set forth in claim 2:
(a) in which said indicating means constitutes at least three individual pointer members;
(b) the outer end portion of each of said individual pointer members being constructed of opaque material equal in extent to substantially the predetermined width of said individual active areas;
(c) and the remainder of said individual pointer members being constructed of clear material whereby light from said primary light source will be arrested only by the opaque end portion of said individual pointer members.

4. In instruments of the dial type including a plurality of indicating members rotatably mounted thereon the combination with apparatus adapted to scan the face of the dial and providing a plurality of electric pulses which when correlated may be used to indicate the positions of the respective indicating members relative to a predetermined position on the dial of the instrument comprising:
(a) an instrument comprising a hollow housing of cylindrical configuration and including a dial member the face of which has a normal relation with respect to the axis of said housing;
(b) major portions of said dial member comprising a primary photo-electric cell;
(c) indicator means of the rotating type mounted on said dial member adjacent said primary cell member and being movable thereon in response to changes in pressure;
(d) a disc member rotatably mounted in said housing adjacent said indicating members and having an opposed relation with respect to said dial member;
(e) the peripheral portion of said disc member being serrated and having light emitting and reset apertures provided therein in spaced relation with respect to said serrations and with respect to each other;
(f) a secondary light source and secondary photo-electric cell means fixedly mounted on opposite sides of said disc member functioning to provide a plurality of electric pulses and a reset electrical pulse as the intensity of light from said secondary light source is varied by said serrations and said reset aperture as said disc rotates;
(g) a primary light source fixedly secured to said disc member adjacent to said light emitting aperture;
(h) and means adjacent said light emitting aperture whereby light passing therethrough is focused and normally contacts said primary cell and functions to provide a principle electric pulse at such time as focused light from said primary light source is interrupted by said indicating means which pulse is adapted to be correlated with said plurality of pulses and reset pulse to determine the exact position of said indicating means on said dial and consequently the elevation of said altimeter.

5. Apparatus as set forth in claim 4:
(a) in which primary photo-electric cell includes at least three individual active areas of circular configuration of predetermined width;
(b) and said individual areas having a concentric relation insulated from each other whereby an individual electric pulse is provided by said individual areas in response to changes in intensity of light contacting said individual areas.

6. Apparatus as set forth in claim 5:
(a) in which said indicating means constitutes at least three individual pointer members;
(b) the outer end portion of each of said individual pointer members being constructed of opaque material equal in extent to substantially the predetermined width of said individual active areas;
(c) and the remainder of said individual pointer members being constructed of clear material whereby light from said primary light source will be arrested only by the opaque end portion of said individual pointer members.

7. In instruments of the dial type including a plurality of indicating members rotatably mounted thereon the combination with apparatus adapted to scan the face of the dial and provides a plurality of electric pulses which when correlated may be used to indicate the positions of the respective indicating members relative to a predetermined position on the dial of the instrument comprising:
(a) an instrument comprising a hollow housing of cylindrical configuration and including a dial member the face of which has a normal relation with respect to the axis of said housing;
(b) indicating means mounted for rotary movement about the axis of said housing and in front of said dial;
(c) the outer end portions of said indicating means being silvered to reflect light falling thereon;
(d) a disc member mounted in said housing for rotation about the axis of said housing at a position adjacent said indicating means and in which major portions thereof constitute photo-sensitive means;

(e) the peripheral portion of said disc member having indexing means provided therein and having light emitting and reset apertures provided therein in spaced relation with respect to said indexing means and with respect to each other;
(f) a secondary light source and photo-sensitive means fixedly mounted on opposite sides of said disc member functioning to provide a plurality of electric pulses and a reset electric pulse as intensity of light from said secondary light source is varied by said indexing means and reset aperture as said disc rotates;
(g) a primary light source fixedly secured to said housing adjacent the periphery of said disc whereby light from said primary light source is reflected through said light emitting aperture by the silvered portion of said indicating means and contacts said photo-sensitive means to provide an electric pulse defining the exact position of said indicating means and which pulse may be correlated with said plurality of pulses and reset pulse to determine the exact position of said indicating means with respect to a position on said dial and consequently the elevation of said altimeter.

8. Apparatus as set forth in claim 7:
(a) in which said photo-sensitive means constitutes at least three active areas of circular configuration and of predetermined width constituting individual cells;
(b) and said individual cells having a concentric relation insulated from each other whereby individual electric pulses are provided by each individual cell in response to changes in intensity of light contacting said individual cells.

9. Apparatus as set forth in claim 8:
(a) in which said indicating means constitutes at least three individual pointer members;
(b) the outer end portion of each of said individual pointer members being constructed of opaque material equal in extent to substantially the predetermined width of said individual active areas;
(c) and the remainder of said individual pointer members being constructed of clear material whereby light from said primary light source will be arrested only by the opaque end portion of said individual pointer members.

References Cited
UNITED STATES PATENTS 2,491,591  12/1949  Sweeny et al. _____ 250—236
3,248,727   4/1966  Anastasia _____ 340—347

WILLIAM F. LINDQUIST, Primary Examiner

M. ABRAMSON, Assistant Examiner

U.S. Cl. X.R.

250—209, 211, 231, 233, 236; 340—170, 347